United States Patent Office 2,965,610
Patented Dec. 20, 1960

2,965,610

PROCESS FOR CURING POLYEPOXIDES AND RESULTING PRODUCTS

Herbert A. Newey, Lafayette, Calif., assignor to Shell Oil Company, New York, N.Y., a corporation of Delaware No Drawing. Filed June 30, 1958, Ser. No. 745,305

7 Claims. (Cl. 260—47)

This invention relates to a process for curing polyepoxides. More particularly, the invention relates to a new process for curing polyepoxides with a special class of polyanhydrides, and to the resulting cured products.

Specifically, the invention provides a new process for curing and resinifying polyepoxides, and preferably glycidyl polyethers of polyhydric phenols and polyhydric alcohols, which comprises mixing and reacting the polyepoxide with a polyanhydride of a tetra- or higher polycarboxylic acid which polyanhydride has at least two carboxylic anhydride groups which are separated by not more than one carbon atom.

As a special embodiment, the invention provides a process for curing and resinifying polyepoxides to form products having superior water and solvent resistance which comprises mixing and reacting the polyepoxide with the above-described polyanhydrides in admixture with monoanhydrides.

Polyepoxides, such as those obtained by reacting epichlorohydrin with polyhydric phenols, can be cured with agents, such as amines and acids, to form resins which have good adhesion and good chemical resistance. Resins having these properties should be of value in the preparation of laminates and molded articles and attempts have been made in the past to utilize the polyepoxides in these applications. The results obtained heretofore, however, have not been entirely satisfactory. The polyepoxides cured with the known curing agents, for example, have not shown the hardness and strength at elevated temperatures and the resistance to water and powerful solvents needed for these applications.

It is an object of the invention, therefore, to provide a new method for curing polyepoxides. It is a further object to provide a method for curing polyepoxides using a new class of curing agents. It is a further object to provide a new method for curing polyepoxides that give products having exceptionally high hot hardness values. It is a further object to provide a method for curing polyepoxides that give products having excellent resistance to powerful solvents. It is a further object to provide a method for preparing cured polyepoxides that have improved water resistance. It is still a further object to provide a new class of curing agents for polyepoxides that are particularly useful in preparing laminates and molded articles. Other objects and advantages of the invention will be apparent from the following detailed description thereof.

It has now been discovered that these and other objects may be accomplished by the process of the invention which comprises mixing and reacting the polyepoxide with a polyanhydride of a tetra- or higher polycarboxylic acid which polyanhydride has at least two carboxylic anhydride groups which are separated by not more than one carbon atom, and particularly with a mixture of these polyanhydrides and a monoanhydride, such as phthalic anhydride.

The polyanhydrides used as curing agents according to the present invention comprise those compounds having polyanhydrides of tetra- or higher polycarboxylic acids which polyanhydrides have at least two anhydride groups, i.e., two

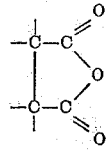

groups, which are separated by not more than one carbon atom. These polyanhydrides may be aliphatic, cycloaliphatic, heterocyclic or aromatic and may be saturated or unsaturated. Examples of these polyanhydrides include, among others, pyromellitic anhydride, di-, tetra- and hexahydropyromellitic anhydride, 1,2,3,4-butanetetracarboxylic acid anhydride, 1,2,4,5-pentanetetracarboxylic acid anhydride, 3-methyl-1,2,4,5-pentanetetracarboxylic acid dianhydride, and the like.

Especially preferred, particularly if the agents are to be used in the preparation of laminates and molded articles, are the aromatic polyanhydrides and particularly pyromellitic anhydride.

The above-described polyanhydrides have surprisingly superior activity when used in admixture with a carboxylic acid monoanhydride, i.e., compounds having a single

group, and they are preferably used in combination with these materials. Examples of monoanhydrides that may be used in combination with the above-described polyaldehydes include, among others, phthalic anhydride, di-, tetra- and hexahydrophthalic anhydride, chlorendic anhydride (hexachloroendomethylenetetrahydrophthalic anhydride), succinic anhydride, chlorosuccinic anhydride, maleic anhydride, 6-ethyl-1,4-cyclohexadiene-1,2-dicarboxylic acid anhydride, 3,6-dimethyl-1,4-cyclohexadiene-1,2-dicarboxylic acid anhydride, 6-butyl-3,5-cyclohexadiene-1,2-dicarboxylic acid anhydride, octadecadienylsuccinic anhydride, nonadecadienylsuccinic acid anhydride, 3-methoxy-1,2,3,6-tetrahydrophthalic anhydride and 3-butoxy-1,2,3,6-tetrahydrophthalic anhydride, and mixtures thereof.

Preferred monoanhydrides comprise the aromatic monoanhydrides and cycloaliphatic monoanhydrides, and particularly the phthalic anhydrides and hydrogenated phthalic anhydrides, such as, for example hexahydrophthalic anhydride, tetrahydrophthalic anhydride, chlorophthalic anhydride and the like. Especially preferred are the liquid or low melting monoanhydrides.

Superior results, particularly as to speed of reaction are also obtained when the polyanhydrides and mixtures of polyanhydrides and monoanhydrides are used in combination with primary, secondary and tertiary amines. Preferred amines are the tertiary amines such as, for example, pyridine, dimethyl aniline, benzyldimethyl amine, dimethylethanolamine, and the like and mixtures thereof.

The polyepoxides to be cured by use of the above anhydrides may be saturated or unsaturated, aliphatic, cycloaliphatic, aromatic or heterocyclic and may be substituted if desired with substituents, such as chlorine atoms, hydroxyl groups, ether radicals, and the like. They may also be monomeric or polymeric.

For clarity, many of the polyepoxides and particularly those of the polymeric type will be described throughout the specification and claims in terms of an epoxy equivalency. The term "epoxy equivalency" refers to the average number of epoxy (i.e.,

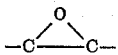

groups) contained in the average molecule. This value is obtained by dividing the average molecular weight of the polyepoxide by the epoxide equivalent weight. The epoxide equivalent weight is determined by heating a one gram sample of the polyepoxide with an excess of pyridinium chloride dissolved in pyridine. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported therein.

If the polyepoxide material consists of a single compound and all of the epoxy groups are intact the epoxy equivalency will be integers, such as 2, 3, 4, and the like. However, in the case of polymeric-type polyepoxides many of the materials may contain some of the monomeric monoepoxides or have some of their epoxy groups hydrated or otherwise reacted and/or contain macromolecules of somewhat different molecular weight so the epoxy equivalency may be quite low and containing fractional values. The polymeric material may, for example, have an epoxy equivalency of 1.5, 1.8, 2.5 and the like.

The polyepoxides may be exemplified by the following:

vinyl cyclohexene dioxide,
epoxidized mono-,
di- and triglycerides,
butadiene dioxide,
1,4-bis(2,3-epoxypropoxy)benzene,
1,3-bis(2,3-epoxypropoxy)benzene,
4,4'-bis(2,3-epoxypropoxy)diphenyl ether,
1,8-bis(2,3-epoxypropoxy)octane,
1,4-bis(2,3-epoxypropoxy)cyclohexane,
4,4' - bis(2 - hydroxy-3,4-epoxybutoxy)diphenyldimethylmethane,
1,3-bis(4,5-epoxypentoxy)-5-chlorobenzene,
1,4-bis(3,4-epoxybutoxy)2-chlorocyclohexane,
diglycydil thioether,
diglycidyl ether,
ethylene glycol diglycidyl ether,
resorcinol diglycidyl ether,
1,2,5,6-diepoxyhexene-3,
1,2,5,6-diepoxyhexane, and
1,2,3,4-tetra(2-hydroxy-3,4-epoxybutoxy)butane.

Other examples include the glycidyl polyethers of polyhydric phenols obtained by reacting a polyhydric phenol with an excess, e.g., 4 to 8 mol excess, of a chlorohydrin, such as epichlorohydrin and dichlorohydrin. Thus, polyether B described hereinafter, which is substantially 2,2-bis(2,3-epoxypropoxyphenyl)propane is obtained by reacting bis-phenol 2,2-bis(4-hydroxyphenyl)propane with an excess of epichlorohydrin in an alkaline medium. Other polyhydric phenols that can be used for this purpose include resorcinol, catechol, hydroquinone, methyl resorcinol, or polynuclear phenols, such as 2,2-bis(4-hydroxy-phenylbutane, 4,4'-dihydroxybenzophenone, bis(4-hydroxyphenyl)ethane, and 1,5-dihydronaphthalene.

Still a further group of the polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. Polyhydric alcohols that may be used for this purpose include glycerol, propylene glycol, ethylene glycol, diethylene glycol, butylene glycol, hexanetriol, sorbitol, mannitol, pentanetriol, pentaerythritol, di- and tripentaerythritol, polyglycerol, dulcitol, inositol, carbohydrates, methyltrimethylolpropane, 2,6-octanediol, 1,2,4,5-tetrahydroxycyclohexane, 2-ethylhexanetrio-1,2,6, glycerol methyl ether, glycerol allyl ether, polyvinyl alcohol and polyallyl alcohol, and mixtures thereof. Such polyepoxides may be exemplified by glycerol triglycidyl ether, mannitol tetraglycidyl ether, pentaerythritol tetraglycidyl ether and sorbitol tetraglycidyl ether.

A further group of the polyepoxides comprises the polyepoxy polyesters obtained by esterifying a polycarboxylic acid with an epoxy-containing alcohol, such as, for example, the diglycidyl ester of adipic acid, the diglycidyl ester of malonic acid, and the diglycidyl ester of succinic acid.

Other polyepoxides include the polyepoxypolyhydroxy polyethers obtained by reacting, preferably in an alkaline medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bis-phenol and bis(2,3-epoxy-2-methylpropyl)ether, the reaction product of resorcinol and bis(2,3-epoxypropyl)ether, and the reaction product of catechol and bis(2,3-epoxypropyl)ether.

A group of polymeric-type polyepoxides comprises the hydroxy-substituted polyepoxy polyethers obtained by reacting, preferably in an alkaline medium, a slight excess, e.g., .5 to 3 mol excess, of a halogen-containing epoxide as described above, with any of the aforedescribed polyhydric phenols, such as resorcinol, catechol, bis-phenol, bis[4-hydroxynaphth - 1 - yl)-2-2-hydroxynaphth-1-yl)] methane and the like.

Other polymeric polyepoxides include the polymers and copolymers of the epoxy-containing monomers possessing at least one polymerizable ethylenic linkages. When this type of monomer is polymerized in the substantial absence of alkaline or acidic catalysts, such as in the presence of heat, oxygen, peroxy compounds, actinic light, and the like, they undergo additional polymerization at the multiple bond leaving the epoxy group unaffected. These monomers may be polymerized with themselves or with other ethylenically unsaturated monomers, such as styrene, vinyl acetate, methacrylonitrile, vinyl chloride, vinylidene chloride, methyl acrylate, methyl methacrylate, diallyl phthalate, vinyl allyl phthalate, divinyl adipate, 2-chloroallyl acetate, and vinyl methallyl pimelate. Illustrative examples of these polymers include poly(allyl 2,3-epoxypropyl ether), poly(2,3-epoxypropyl crotonate), allyl 2,3-epoxypropyl ether-styrene copolymer, methallyl 3,4-epoxybutyl ether-allyl benzoate copolymer, poly(vinyl 2,3-epoxypropyl)ether, allyl glycidyl ether-vinyl acetate copolymer and poly[4-(2',3'-glycidyloxy)styrene].

Coming under special consideration are the polyglycidyl polyethers of polyhydric alcohols obtained by reacting the polyhydric alcohol with epichlorohydrin, preferably in the presence of 0.1% to 5% by weight of an acid-acting compound, such as boron trifluoride, hydrofluoric acid, stannic chloride or stannic acid. This reaction is effected at about 50° C. to 125° C. with the proportions of reactants being such that there is about one mole of epichlorohydrin for every equivalent of hydroxyl group in the polyhydric alcohol. The resulting chlorohydrin ether is then dehydrochlorinated by heating at about 50° C. to 125° C. with a small, e.g., 10% stoichiometrical excess of a base, such as sodium aluminate.

The products obtained by the method shown in the preceding paragraph may be described as halogen-containing ether epoxide reaction mixtures and products are polyether polyepoxide reaction products which in general contain at least three non-cyclic ether (—O—) linkages, terminal epoxide-containing ether

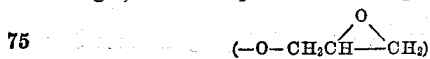

groups, and halogen attached to a carbon of an intermediate

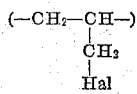

group.

These halogen-containing polyether polyepoxide reaction products, obtainable by partial dehydrohalogenation of polyhalohydrin alcohols may be considered to have the following general formula

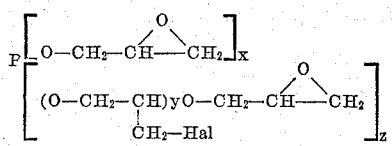

in which R is the residue of the polyhydric alcohol which may contain unreacted hydroxyl groups, X indicates one or more of the epoxy ether groups attached to the alcohol residue, $y$ may be one or may vary in different reaction products of the reaction mixture from zero to more than one, and Z is one or more, and $X+Z$, in the case of products derived from polyhydric alcohols containing three or more hydroxyl groups, averages around two or more so that the reaction product contains on the average two or more than two terminal epoxide groups per molecule.

The preparation of one of these preferred polyglycidyl ethers of polyhydric alcohols may be illustrated by the following example showing the preparation of a glycidyl polyether of glycerol.

PREPARATION OF GLYCIDYL POLYETHERS OF POLYHYDRIC ALCOHOLS

Polyether A

About 276 parts (3 mols) of glycerol was mixed with 832 parts (9 mols) of epichlorohydrin. To this reaction mixture was added 10 parts of diethyl ether solution containing about 4.5% boron trifluoride. The temperature of this mixture was between 50° C. and 75° C. for about three hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amount of 261 parts, was a pale yellow, viscous liquid. It had an epoxide value of 0.070 equivalent per 100 grams and the molecular weight was 324 as measured ebullioscopically in dioxane solution. The epoxy equivalency of this product was 2.13. For convenience, this product will be referred to hereinafter as polyether A.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 170 and 900.

Also of great importance are the monomeric and polymeric glycidyl polyethers of dihydric phenols obtained by reacting epichlorohydrin with a dihydric phenol in an alkaline medium. The monomeric products of this type may be represented by the general formula

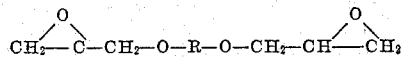

wherein R represents a divalent hydrocarbon radical of the dihydric phenol. The polymeric products will generally not be a single simple molecule but will be a complex mixture of glycidyl polyethers of the general formula

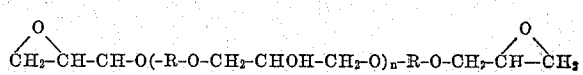

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value of $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyethers of the dihydric phenols will be illustrated below.

PREPARATION OF GLYCIDYL POLYETHERS OF DIHYDRIC PHENOLS

Polyether B

About 2 mols of bis-phenol was dissolved in 10 mols of epichlorohydrin and 1 to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal amount of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value of 0.50 eq./100 g., and an epoxy equivalency of 1.75. For convenience, this product will be referred to hereinafter as polyether B.

Polyether C

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature the product was an extremely viscous semi-solid having a melting point of 27° C. by Durrans' Mercury Method and a molecular weight of 483. The product had an epoxy value of 0.40 eq./100 g., and an epoxy equivalency of 1.9. For convenience, this product will be referred to as polyether C.

Polyether D

About 228 parts of bis-phenol and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at 130° C. The Durrans' Mercury Method melting point of the resulting product is 52° C. and the molecular weight is about 710. The product has an epoxy value of 0.27 eq./100 g. and an epoxy equivalency of 1.9. For convenience, this product will be referred to as polyether D.

Particularly preferred members of the above-described group are the glycidyl polyethers of the dihydric phenols, and especially 2,2-bis(4-hydroxyphenyl)propane, having an epoxy equivalency between 1.1 and 2.0 and a molecular weight between 300 and 900. Particularly preferred are those having a Durrans' Mercury Method softening point below about 60° C.

The glycidyl polyethers of polyhydric phenols obtained by condensing the polyhydric phenols with epichlorohydrin are also referred to as "ethoxyline" resins. See Chemical Week, vol. 69, page 27, for September 8, 1951.

Of particular value in the process of the invention are the polyepoxides containing only carbon, hydrogen, oxygen and halogen atoms.

The curing of the polyepoxides is effected by admixing and reacting the above-described anhydrides with the polyepoxide. The curing takes place at room temperature, but under these conditions the rate is sometimes quite slow and it is desirable to heat the mixture to speed the cure. Preferred temperatures range from about 50° C. to 250° C. and more preferably from about 50° C. to 150° C.

The quantities in which the polyanhydride and polyepoxide are combined will vary over a wide range. To obtain the best cure, the polyanhydride is preferably employed in about at least a chemical equivalent amount, i.e., in an amount sufficient to furnish one carboxylic anhydride group, i.e., a

group, for every epoxy group in the polyepoxide. Still more preferably, the polyanhydride and polyepoxide are combined in chemical equivalent ratios varying from about .5:1 to .1.5:1, and generally between .8:1 and 1:1.

When the anhydrides are employed in admixture with the polyanhydrides, the monoanhydride group will be considered in determining the equivalent amount of curing agent to be utilized. In such mixtures, the polyanhydride should make up at least 10% of the total equivalent amount. The above-noted superior results are especially evident when the polyanhydride is employed in admixture with the monoanhydride and the polyanhydride as used in amounts varying from 40% to 90% of the total equivalent amount and the monoanhydride is used in amounts varying from 60% to 10% of the total equivalent amounts.

The amine activators noted above are generally employed in amounts varying from .5 part to 4 parts per 100 parts of polyepoxide, and more preferably from 1 part to 3 parts per 100 parts of polyepoxide.

In executing the process of the invention, it is desirable to have the polyepoxide in a mobile liquid condition when the anhydride agent is added in order to facilitate mixing. With those polyepoxides that are liquid, but too viscous for ready mixing, one may either heat to reduce viscosity, or have a liquid solvent added thereto in order to provide fluidity. Normally solid polyepoxides are likewise either melted or mixed with a liquid solvent. Various solvents are suitable for achieving the desired fluidity. They may be volatile solvents which escape from the polyepoxide composition containing the polyanhydride by evaporation before or during the curing, such as ketones like acetone, methyl ethyl ketone, methyl isobutyl ketone, isophorne, etc. esters such as ethyl acetate, butyl acetate, Cellosolve acetate (ethylene glycol monoacetate) methyl Cellosolve acetate (acetate of ethylene glycol monomethyl ether), etc.; ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons, such as benzene, toluene, xylene, etc., and/or alcohols, such as ethyl, isopropyl or n-butyl alcohol. Solvents which remain in the cured composition may also be used, such as diethyl phthalate, dibutyl phthalate, or liquid monoepoxy compounds, including glycidyl allyl ether, glycidyl phenyl ether, styrene oxide, 1,2-hexylene oxide, glycide, and the like, as well as cyano-substitued hydrocarbons, such as acetonitrile, propionitrile, adiponitrile, benzonitrile, and the like. It is also convenient to employ the solid or semi-solid polyepoxides in combination with a liquid polyepoxide, such as a normally liquid glycidyl polyether of a polyhydric alcohol.

Various other ingredients may be mixed with the polyepoxide composition including pigments, fillers, dyes, plasticizers, resins, and the like.

The resinified products obtained by the above-described process have surprisingly high hot hardness and strength values at elevated temperatures. In addition, they display excellent resistance to boiling water and powerful solvents, such as acetone. These unusual properties make the process of particular value in the preparation of laminates and molding articles.

In preparing the laminate, the sheets of fibrous material are first impregnated with the mixture of polyepoxide and anhydride. This is conveniently accomplished by dissolving the anhyride in acetone and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20 to 25° C.) it is preferred to use somewhat elevated temperature such as about 50° C. to 200° C. with the impregnated sheet stock passing through or hanging free in an oven or other suitable equipment. The resinification is arrested before infusible product occurs by cooling below about 40° C. preferably to 20° C. to 25° C. A plurality of the impregnated sheets are then superposed and the assembly is cured in a heated press under a pressure of about 25 to 500 or more pounds per square inch. The resulting laminate is extremely strong and resistant against the action of organic and corrosive solvents.

The fibrous material used in the preparation of the laminates may be of any suitable material, such as glass cloth and matting, paper, asbestos paper, mica flakes, cotton bats, duck muslin, canvas and the like. It is usually preferred to utilize woven glass cloth that has been given prior treatment with well known finishing or sizing agents, therefor, such as chrome methacrylate or vinyl tricholorosilane.

When using the above-noted curing agents to prepare molded articles, it is generally preferred to first prepare a molding powder by milling together a mixture of the polyepoxide, anhydride and customary fillers and mold release agents. Usually the milled mixture is set up so that the polyepoxide has set up to a fusible resin. The milled mixture is then ground and molded articles prepared therefrom with conversion of the polyepoxide to the infusible state with the use of molding machines such as those for compression molding or transfer molding. If desired, the milled mixture may be prepared in preform pellets and the like.

To illustrate the manner in which the invention may be carried out, the following examples are given. It is to be understood, however, that the examples are for the purpose of illustration and the invention is not to be regarded as limited to any of the specific materials or conditions recited therein.

EXAMPLE I

This example illustrates the use of pyromellitic anhydride as a curing agent for polyether A (prepared as shown above).

100 parts of polyether A was heated to 90° C. and 65 parts of pyromellitic anhydride was mixed in with stirring. The mixture was placed in an air oven at about 115° C. A resinified product was obtained which was hard and had good water and solvent resistance.

EXAMPLE II

This example illustrates the use of a mixture of pyromellitic anhydride and phthalic anhydride with an amine activator as curing material for polyether B and the unexpected superior improvement in hot hardness that is obtained therewith.

(a) A series of resinous compositions were prepared from polyether B and the curing agents listed in the table below. 100 part portions of polyether B were heated to 65° C., and 2 parts of benzyldiamine and the noted amount of curing agent added thereto. The mixtures were next cooled to room temperature (about 25° C.) and then placed in an air oven regulated to a temperature of 100° C. The castings remained in the oven for a period of 2 hours in order to effect resinification whereupon the hardness was measured with the resins at the tabulated temperatures with a Barcol Impressor. The results are indicated in the table below.

| Curing Agent | Phr.[1] | Barcol Hardness at— | | | | | |
|---|---|---|---|---|---|---|---|
| | | 25° C. | 60° C. | 80° C. | 100° C. | 120° C. | 150° C. |
| (1) Phthalic anhydride | 75 | 40 | 30 | 26 | 11 | 0 | 0 |
| (2) Phthalic anhydride with Pyromellitic anhydride (.96 to 1 of epoxide) | 55 14 | 40 | | | 30 | | 12 |
| (3) m-phenylene diamine | 12.5 | 33 | | | 7 | | 0 |

[1] Parts per hundred parts of resin.

The foregoing results demonstrate that only with the pyromellitic anhydride mixture is there obtained a resinous product having good hardness at 150° C. It may be further noted that a Barcol hardness of zero does not necesarily represent this value on the hardness scale; a zero value may well be less than this hardness or a minus value because the Barcol Impressor is so constructed as to be incapable of measuring hardness which is a negative value.

(b) Castings of polyether B prepared as shown in (a) above were placed in boiling water for 3 hours and some were placed in boiling acetone for 3 hours. The hardness of the castings was then determined by the Barcol Impressor. The results are indicated in the table below:

| Curing Agent | Phr. | After Boiling Water 3 hours | After Boiling Acetone 3 hours |
|---|---|---|---|
| (1) Phthalic anhydride | 75 | 35 | 25 |
| (2) Phthalic anhydride Pyromellitic anhydride | 55 14 | 38 | 39 |

The foregoing results demonstrate that only with the pyromellitic anhydride mixture is there obtained a resinous product having satisfactory resistance to water and acetone.

EXAMPLE III

This example illustrates the use of a mixture of pyromellitic anhydride and hexahydrophthalic anhydride with an amine activator as curing material for polyether B and the unexpected superior improvement in hot hardness.

(a) A series of resinous compositions were prepared from polyether B and the curing agents listed in the table below. 100 part portions of polyether B were heated to 65° C. and 2 parts of benzyldimethylamine and the noted amount of curing agent added thereto. The mixtures were next cooled to room temperature and then placed in an air oven regulated to a temperature of 100° C. The castings remained in the oven for a period of 2 hours in order to effect resinification whereupon the hardness was measured with the resins at tabulated temperatures with a Barcol Impressor. The results are indicated in the table below:

| Curing Agent | Phr. | RT[1] | Barcol Hardness at— | | | |
|---|---|---|---|---|---|---|
| | | | 60° C. | 80° C. | 100° C. | 120° C. |
| (1) Hexahydrophthalic anhydride | 80 | 38 | 26 | 21 | 13 | 0 |
| (2) Hexahydrophthalic Pyromellitic anhydride | 60 14 | 46 | 35 | 30 | 25 | 20 |

[1] Room temperature.

(b) Castings of polyester B prepared as shown in (a) above were placed in boiling water for 3 hours and some were placed in boiling acetone for 3 hours. The hardness of the castings was then determined by the Barcol Impressor. The results are indicated in the table below:

| During Agent | Phr. | After Boiling Water 3 hours | After Boiling Acetone 3 hours |
|---|---|---|---|
| (1) Hexahydrophthalic anhydride | 80 | 35 | 18 |
| (2) Hexahydrophthalic anhydride Pyromellitic anhydride | 60 14 | 43 | 41 |

EXAMPLE IV

This example illustrates the use of a mixture of pyromellitic anhydride and phthalic anhydride as a curing agent for polyether A.

A series of resinous compositions were prepared from polyether A and the curing agents listed in the table as follows. 100 part portions of polyether A were heated to 65° C. and 2 parts of dimethylethanol amine and the noted amount of curing agent added thereto. The mixtures were next cooled to room temperature and then placed in an air oven regulated to a temperature of 100° C. The castings remained in the oven for a period of 2 hours in order to effect resinification. The hardness of the castings at the indicated temperatures and after boiling in water and acetone was determined with the Barcol Impressor. The results are indicated in the table below:

| Curing Agent | Phr. | RT | Barcol Hardness at— | | After Boiling Water 3 hrs. | After Boiling Acetone 3 hrs. |
|---|---|---|---|---|---|---|
| | | | 60° C. | 80° C. | | |
| (1) Phthalic anhydride | 104 | 36 | 27 | 18 | 19 | 0 |
| (2) Phthalic anhydride Pyromellitic anhydride | 69 25 | 36 | 37 | 28 | 32 | 45 |

EXAMPLE V

This example illustrates the use of a mixture of pyromellitic anhydride and hexahydrophthalic anhydride as a curing agent for polyether A.

A series of resinous compositions were prepared from polyether A and the curing agents listed in the table as follows. 100 part portions of polyether A were heated to 65° C. and 2 parts of dimethylethanol amine and the noted amount of curing agent added thereto. The mixtures were next cooled to room temperature and then placed in an air oven regulated to a temperature of 100° C. The castings remained in the oven for a period of 2 hours in order to effect resinification. The hardness of the castings at the indicated temperatures and after boiling in water and after boiling in acetone was determined with the Barcol Impressor. The results are indicated in the table below:

| Curing Agent | Phr. | RT | Barcol Hardness at— | | After Boiling Water 3 hrs. | After Boiling Acetone 3 hrs. |
|---|---|---|---|---|---|---|
| | | | 60° C. | 80° C. | | |
| (1) Hexahydrophthalic anhydride | 108 | 29 | 0 | 0 | 0 | 0 |
| (2) Hexahydrophthalic anhydride | 72 | | | | | |
| Pyromellitic anhydride | 25 | 44 | 31 | 19 | 29 | 31 |

EXAMPLE VI

This example illustrates the use of a mixture of pyromellitic anhydride and phthalic anhydride as curing agent for polyether C.

100 parts of polyether C was heated to 65° C. and a mixture of 10.9 parts of pyromellitic anhydride and 44.4 parts phthalic anhydride added thereto with stirring. The mixture was placed in an air oven at about 115° C. A resinified product was obtained which was very hard and had good water and solvent resistance.

EXAMPLE VII

This example illustrates the use of a mixture of hexahydropyromellitic anhydride and phthalic anhydride as curing agent for polyether A.

100 parts of polyether A was heated to 65° C. and a mixture of 15.7 parts of hexahydropyromellitic anhydride and 82.8 parts of phthalic anhydride added thereto with stirring. The mixture was placed in an air oven at about 115° C. A resinified product was obtained which was hard and had good water and solvent resistance.

EXAMPLE VIII

This example illustrates the use of a mixture of pyromellitic anhydride and phthalic anhydride as curing agent for polyether D.

100 parts of polyether D was heated to 80° C. and a mixture of 9.8 parts of pyromellitic anhydride and 21.8 parts of phthalic anhydride added thereto with stirring. The mixture was placed in an air oven at about 115° C. A resinified product was obtained which was hard and had good water and solvent resistance.

EXAMPLE IX

This example illustrates the use of a mixture of pyromellitic anhydride and chlorendic anhydride as curing agents for an epoxidized triglyceride.

100 parts of an epoxidized soybean oil having an epoxy value of 0.40 eq./100 g. was heated to 65° C. and a mixture of 10.9 parts of pyromellitic anhydride, 111 parts of chlorendic anhydride and 2 parts of benzyldiamine added thereto with stirring. The mixture was placed in an air oven at about 115° C. A resinified product was obtained which was hard and had good water and solvent resistance.

EXAMPLE X

This example illustrates the preparation of a laminate using a mixture of polyether B, pyromellitic anhydride, phthalic anhydride and an amine catalyst.

100 parts of polyether B was combined with an acetone solution containing 14 parts of pyromellitic anhydride, 55 parts of phthalic anhydride and 2 parts of benzyldimethyl amine. This solution had a solids content of about 60%. Sheets of fiberglass cloth 181-Volan A were impregnated by painting the solutions on the cloth and then drying them for 30 to 50 minutes at 90° C. while hanging free in an air oven to form non-tacky sheets. This treatment resinified the polyether to a fusible product. Assemblies of 12 piles of superposed impregnated cloth were then prepared. The assemblies were cured in a press operating at the temperature indicated in the table below. A curing cycle was used wherein the assembly was first subjected to mere contact pressure for a minute or so and then the pressure was increased to 200 pounds per square inch (p.s.i.) The resulting laminates had good hardness, and flexure strength nad improved resistance to water and solvents.

EXAMPLE XI 100 parts of polyether A was heated to 90° C. and 45 parts of pyromellitic anhydride was mixed in with stirring. The mixture was placed in an air oven at about 125° C. A resinified product was obtained which was hard and had good water and solvent resistance.

EXAMPLE XII 100 parts of polyether A was heated to 90° C. and 37.2 parts of phthalic anhydride and 6.7 parts of pyromellitic anhydride added thereto. The mixture was heated in an oven at 125° C. for several hours. The resulting product was a very hard tough solvent resistant casting.

EXAMPLE XIII

Examples I, II, III and XII are repeated with the exception that the polyether A and B are replaced by an addition polymer of glycidyl methacrylate having an epoxy value of .5 eq./100 g. The resulting products are hard tough solvent resistant castings.

EXAMPLE XIV

Examples I, II, III and XII are repeated with the exception that the polyether A and B are replaced by 2,2-bis(3,4-epoxycyclohexyl)propane. The resulting products are hard strong solvent resistant castings.

EXAMPLE XV

Examples I, II, III and XII are repeated with the exception that the polyether A and B are replaced by vinyl cyclohexene diepoxide. The resulting products are strong hard castings.

EXAMPLE XVI

Examples I, II, III and XII are repeated with the exception that the polyether A and B are replaced by diglycidyl phthalate. The resulting products are strong hard castings.

This application is a continuation-in-part of my copending application Serial No. 486,020, filed February 3, 1955.

I claim as my invention:

1. A process for producing a resinified product which comprises heating at a temperature between 50° C. and 280° C. a polyepoxide having a

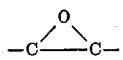

equivalency between 1.1 and 4 with a curing amount of a mixture of (1) a polyanhydride of the group consisting of pyromellitic anhydrides and hydrogenated pyromellitic anhydrides, and (2) a dissimilar dicarboxylic acid anhydride possessing a single

group.

2. A process as in claim 1 wherein the mixture of anhydrides is a mixture of pyromellitic anhydride and phthalic anhydride.

3. A process as in claim 1 wherein the mixture of anhydrides is a mixture of pyromellitic anhydride and hexahydrophthalic anhydride.

4. A process as in claim 1 wherein the mixture of anhydrides is a mixture of pyromellitic anhydride and hexachloroendomethylene-tetrahydrophthalic anhydride.

5. A process for producing a resinified product which comprises mixing and reacting at a temperature between 50° C. and 280° C. a glycidyl polyether of a polyhydric compound of the group consisting of polyhydric alcohols and polyhydric phenols, which glycidyl ether has an epoxy equivalency of at least 1.1 and a molecular weight above about 200 with a mixture of pyromellitic anhydride and a dissimilar dicarboxylic acid anhydride in the presence of an amine accelerator, the total amount of the anhydride curing agent being sufficient to convert the glycidyl polyether into an acetone insoluble product.

6. A process as in claim 5 wherein the glycidyl polyether is a gylcidyl polyether of 2,2-bis(4-hydroxyphenyl)propane.

7. A process as in claim 5 wheren the glycidyl polyether is a glycidyl polyether of glycerol.

References Cited in the file of this patent

Charlton: "Modern Plastics," vol. 32, No. 1, September 1954, pp. 155, 240, 241.